United States Patent [19]
Gregg

[11] Patent Number: 5,938,786
[45] Date of Patent: Aug. 17, 1999

[54] SIMPLIFIED RECOVERY OF DAMAGED FRAMES IN A COMMUNICATION LINK

[75] Inventor: Thomas Anthony Gregg, Highland, N.Y.

[73] Assignee: International Business Machines Corporation, Armonk, N.Y.

[21] Appl. No.: 08/565,598

[22] Filed: Nov. 30, 1995

[51] Int. Cl.[6] ................................................... G08C 25/02
[52] U.S. Cl. ................ 714/748; 395/200.1; 395/200.13; 395/825
[58] Field of Search ........................... 371/32; 395/200.1, 395/200.13, 825; 361/45

[56] References Cited

U.S. PATENT DOCUMENTS

| | | | |
|---|---|---|---|
| 4,621,362 | 11/1986 | Sy ............................................. | 370/88 |
| 5,357,608 | 10/1994 | Bartow et al. ........................... | 395/200 |
| 5,410,536 | 4/1995 | Shah et al. ................................ | 371/32 |
| 5,422,893 | 6/1995 | Gregg et al. .............................. | 371/32 |
| 5,481,738 | 1/1996 | Bartow et al. ........................... | 395/800 |
| 5,490,152 | 2/1996 | Gregg et al. .............................. | 371/32 |
| 5,490,153 | 2/1996 | Gregg et al. .............................. | 371/32 |
| 5,559,963 | 9/1996 | Gregg et al. ........................ | 395/200.13 |
| 5,574,945 | 11/1996 | Elko et al. ................................ | 395/825 |
| 5,610,945 | 3/1997 | Gregg et al. .............................. | 361/45 |

OTHER PUBLICATIONS

Serial No. 08/286,028 filed Aug. 4, 1994—Docket PO994031 entitled "Shortened Timeout Period During Frame Retry In A Communication Link" by T. A. Gregg et al.

Serial No. 08/286,030 filed Aug. 4, 1994—Docket PO994030 entitled "Recovery Of Lost Frames In A Communication Link" by Gregg et al.

*Primary Examiner*—William Grant
*Assistant Examiner*—McDieunel Marc
*Attorney, Agent, or Firm*—Marc A. Ehrlich; Lawrence D. Cutter

[57] ABSTRACT

An apparatus and method is provided for asynchronously transmitting data across fiber optical cables in a serial manner. Frames are provided as a mechanism to transmit associated data over a serial link and to tie the data being transmitted to a particular buffer set. Each outstanding request for each buffer set is individually timed to detect lost frames, and each buffer set maintains a state that keeps track of the progress and sequence of received frames. When transmission errors occur in the frames, the errors may affect only the information field in which case there is enough information in the header to identify the frame. If a frame is damaged, any outstanding operations for the affected buffer set are cleared, and any commands are brought to a logical ending point. The computer system which originates the frames is then notified of the specific nature of the error, and which information is supplied to help the originating computer system efficiently conclude the recovery procedure.

10 Claims, 6 Drawing Sheets

| IFCC REASON CODE | RECOVERY ACTION |
|---|---|
| BAD MCB | COMMAND WAS NOT STARTED, RESEND COMMAND |
| BAD MRB | COMMAND WAS EXECUTED, ANY DATA WAS RECEIVED OK. QUERRY MESSAGE PROCESSOR FOR MRB |
| BAD DATA | COMMAND WAS EXECUTED, BAD INBOUND DATA. QUERRY MESSAGE PROCESSOR |
| CMD QUI | COMMAND COMPLETION UNKNOWN: TIMEOUT, DAMAGED OUTBOUND DATA, DAMAGED INBOUND DATA. QUERRY MESSAGE PROCESSOR |

FIG. 9

| IFCC REASON CODE | RECOVERY ACTION |
|---|---|
| BAD MCB | COMMAND WAS NOT STARTED, RESEND COMMAND |
| BAD MRB | COMMAND WAS EXECUTED, ANY DATA WAS RECEIVED OK. QUERRY MESSAGE PROCESSOR FOR MRB |
| BAD DATA | COMMAND WAS EXECUTED, BAD INBOUND DATA. QUERRY MESSAGE PROCESSOR |
| CMD QUI | COMMAND COMPLETION UNKNOWN: TIMEOUT, DAMAGED OUTBOUND DATA, DAMAGED INBOUND DATA. QUERRY MESSAGE PROCESSOR |

SIMPLIFIED RECOVERY OF DAMAGED FRAMES IN A COMMUNICATION LINK

FIELD OF THE INVENTION

The present invention relates to data communication systems. More particularly, the present invention relates to data communication systems using optical fibers to carry information.

BACKGROUND OF THE INVENTION

Fiber optics enable the transmission of long strings of data in a serial fashion from a driver to a receiver at long distances (kilometers) and at very high data rates (billions of bits per second). This is in contrast to traditional electrical wires which allow data to be transmitted for only short distances at these data rates (10's of meters).

Fiber optic data transmission is, however, inherently noisy in that bit errors in the data are frequent. Error rates of one in a trillion or even one in a billion bits are common. Various checking methods including cyclic redundancy codes are used to detect these errors.

In some systems, once a transmission error is detected, the detecting end of the link may request the other end of the link to resend the frame in which the error occurred. There are several methods of determining which frame had the transmission error. One method is to assign a sequence number to each frame. If a receiver detects a frame with a sequence number that is out of order, it can assume that one or more frames were lost. Using the sequence number of the last correctly received frame, the receiver can request that lost frames be retransmitted.

Another method of determining the frame which is in error is to use separate checking fields for the header and information fields. Thus, if the information field is in error, the chances are that the header identifying the frame is still error free. Using the frame header information, the detecting end of the link can request the frame to be retransmitted. However, both of the methods described above constitute a low level recovery system where the retransmission of the frame is performed by the link hardware facility.

In the systems described above, it is still possible that a frame is lost and that a request for retransmission is never completed. Sequence numbers require subsequent frames for the detection of the frame in error, and using separate checking fields for the frame header does not guarantee that the frame header itself is not in error. Because of these shortcomings, it is usual practice to time outstanding requests to detect missing responses. These timers detect both damaged frames and unusually long response times in the system. If these timers run beyond their expiration intervals, a higher level recovery procedure, implemented in software, is invoked.

The facilities required by both the originator and recipient of data to retransmit the frame are not trivial, and a considerable simplification can be realized if the low level recovery actions can be efficiently escalated to a high level recovery procedure.

Thus what is needed is a mechanism by which lower level recovery actions, which necessarily require retransmission of frames, can be eliminated and the higher level recovery actions can be invoked without waiting for a timeout to occur. The mechanism of the present invention uses procedures at both ends of the link, and new frames are used to signal the error and the state of the link.

SUMMARY OF THE INVENTION

The present invention comprises an apparatus and method for asynchronously transmitting data blocks between two systems. Two fiber optic carriers are used to interconnect the two systems and to provide serial data transmission in both directions. Together, these fiber optic carriers and their supporting hardware is called a link. Frames are provided as a mechanism to transmit data serially on each fiber. A frame contains all or part of the contents of a request, a response, or a data area.

The protocol for data transmission includes a request sent from one system to another followed by data areas transmitted in either direction and followed by a response sent back to the requesting system. Each sequence of request, data, and response is called an operation, and multiple operations may be interleaved over the link. For each operation, strict ordering of the request, data, and response is maintained. The systems maintain state information as to the progress of each operation that they have originated or to which they are responding. To help maintain state information, frame headers of the requests and responses include an indicator (the A-bit) informing the receiver that data areas are associated either with the request or with the response.

A collection of timers is used to time each individual operation. The timers are preferably initialized to a predetermined positive value and are decremented. (However, any initial value may be employed, and timer interval expiration could be set to occur when the timer reached any preselected value.) A timer is initialized and started when a request is sent, and it is stopped when the response is received. If the timer reaches zero before the response is received, a higher level recovery procedure is invoked.

According to one embodiment of the present invention, when a frame that has been damaged by a transmission error is received, the operation is quiesced, if required, and an error is indicated to the system that started the operation. It is then the responsibility of the initiating system to perform the required higher level recovery procedure.

It is also an object of the present invention to include an error report to the initiating system describing the progress of the operation at the time of this report.

It is also an object of the present invention to have different functions performed depending on which end of the link detected the error and in further dependence on which frame was in error.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 9 is a table of interface control check error codes and their associated recovery procedures.

DETAILED DESCRIPTION OF THE PREFERRED EMBODIMENTS

Figure 1:
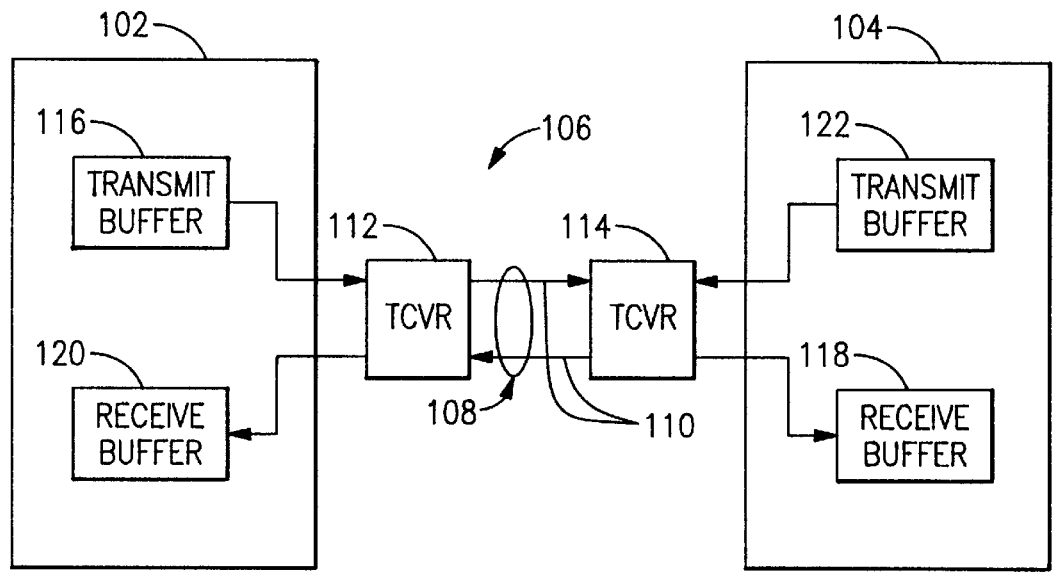
FIG. 1 is a block diagram of a physical link between two computing elements.

Turning first to FIG. 1, a physical link between two computing systems or computing elements 102, 104 is illustrated. These elements could be, for example, two computers or a computer and a shared memory device. In any event, computing elements 102, 104 are connected by means of intersystem channel link 106 comprising fiber optic link 108. Fiber optic link 108 comprises fiber pair 110. A fiber pair comprises two optical fibers, one for transmitting information and one for receiving information. Fiber pair 110 is coupled to computing elements 102 and 104 by means of transceivers, 112 and 114, located at opposite ends of the link. Each of the transceivers, 112 and 114, includes a transmitter unit and a receiver unit.

All of the data traffic over fiber optic bus 108 supports message passing between computing elements 102 and 104. A typical message is a message command sent from computing element 102 to computing element 104. Data may be associated with the message command and is either sent from computing element 102 to computing element 104 (a write operation) or from computing element 104 to computing element 102 (a read operation). After the data is transferred, a message response is sent from computing element 104 to computing element 102. The messages, consisting of commands, data, and responses are stored in buffers (116, 118, 120, 122) located in the computing elements, as shown. To transfer a command, data, or response, transmit buffers 116 and 122 and receive buffers 118 and 120 are required in computing elements 102 and 104. It should be understood that transmitting buffers 116 and 122 may be located anywhere in transmitting computing elements 102 and 104, including main processor storage. It should be further understood that receive buffers 118 and 120 must at all times be immediately accessible by transceivers 112 and 114. Therefore, receive buffers 118 and 120 are usually implemented as arrays of memory elements dedicated to the channel, and they are not included in main processor storage where access is shared among many different elements within computing elements 102 and 104.

To process a complete message with data requires buffers in both computing elements, 102 and 104. The computing element (and its associated programming) that initiates the message is the originator, and the computing element that processes the message is the recipient. For example, a program at the originator computing element executes a SEND MESSAGE instruction that initiates the message, and a message processor (another program) at the recipient computing element processes the message.

Figure 2:
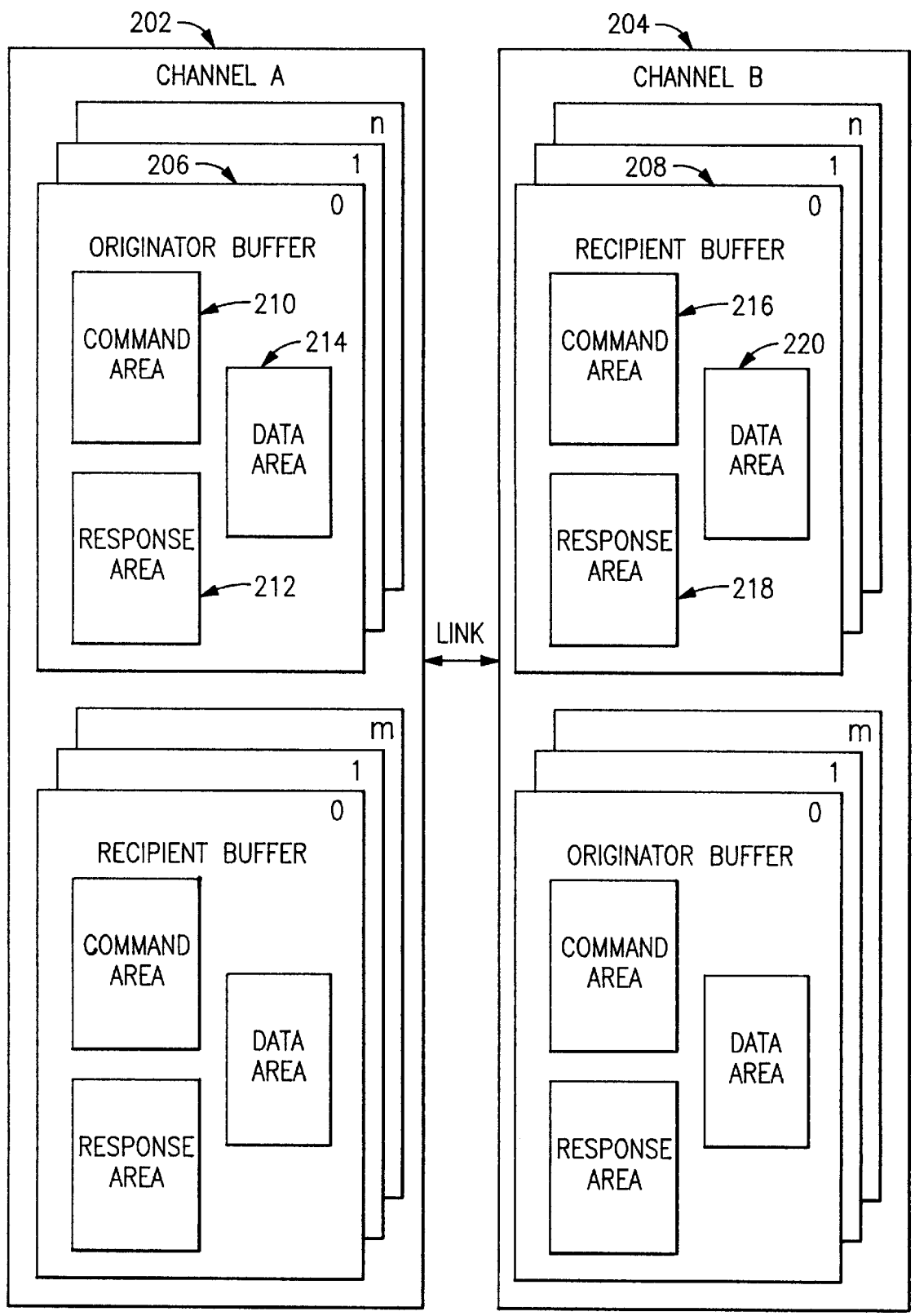
FIG. 2 is a block diagram illustrating a multimessage channel buffer structure.

FIG. 2 shows multiple buffers on both sides of a link. For example, to pass a message with data from Channel A (202) to Channel B (204) requires Channel A originator buffers shown in block 206 and Channel B recipient buffers shown in block 208. Each group of buffers in blocks 206 and 208 are called "buffer sets". When a message is sent, originator buffer request area 210 is loaded with a message command, and a message command is sent over the link to recipient buffer command area 216. If data is to be transferred, it is either sent from originator buffer data area 214 to recipient buffer data area 220 for a write operation, or it is sent from recipient buffer data area 220 to originator buffer data area 214 for a read operation. After data transfer, if any, the response is loaded into the recipient buffer response area 218 and sent across the link to originator buffer response area 212.

The information transferred from one side of the link to the other is contained in frames. This information is always targeted to a particular buffer area, and the targeting information is contained in the link-control (LC) word of the frame. This targeting information allows the frames to be multiplexed over the link in any order. As an example, returning to FIG. 2, Channel A (202) could send a message command for buffer set 1 followed by write data for buffer set 0, followed by a response for buffer set 0, etc. It should be understood that a computing element can dynamically set up various numbers of originator and/or recipient buffers depending on the number and type of links to be established.

Figure 3:
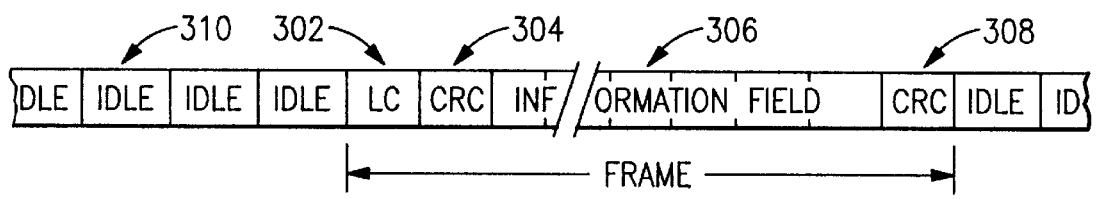
FIG. 3 is a block diagram illustrating the format of an exemplary frame.

The format of an exemplary frame is illustrated in FIG. 3. When no frames are being transmitted, idle words 310 are continuously sent on the link. When frames are transmitted, they start with a data word which is link-control word (LC) 302. Various fields in link-control word 302 identify frame format and type, designate a buffer set area, and control states of the transceiver and the link. These fields are described in more detail below.

A link-control-CRC (cyclical redundancy check) word 304 follows the link-control word. Link-control-CRC word 304 is conventionally generated from the values in the link-control word. Link-control-CRC word 304 is checked at the receiver to test the validity of the link-control field in the incoming frame.

There are two types of frames, control frames and information frames. Control frames do not have an information field. They comprise only a link-control word and a link-control-CRC word. An information frame has link-control word 302, link-control-CRC word 304 and information field 306. Information fields contain, for example, from one to 1,024 words. A word is typically 4 bytes in length. The information field contains information sent from a buffer set area at one end of the link to a buffer set area at the other end of the link.

An information field is followed by an information-field-CRC word 308. The information-field-CRC word is conventionally generated from the values in the information field. The information field CRC word is checked at the receiver to test the validity of the information field in the incoming frame.

Figure 4:
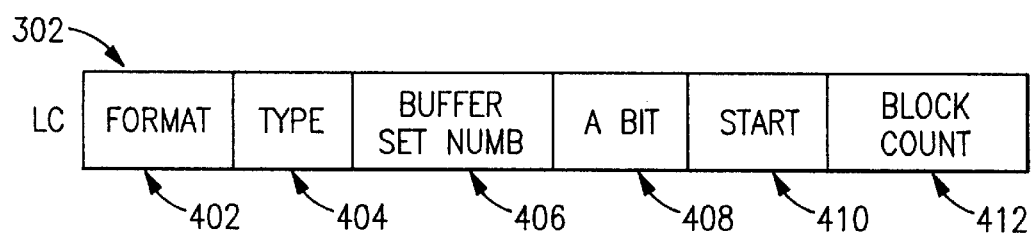
FIG. 4 is a block diagram illustrating the contents of the Link Control word.

FIG. 4 shows details of link-control word 302. Format bit 402 indicates whether or not the frame contains an information field. Message commands, responses, and data frames all have an information field while acknowledgements and error frames do not have an information field. Type field 404 specifies whether the frame is a message command, a response, or a data frame. Buffer set number field 406 specifies which buffer set is the target. A-bit 408 has two uses. In a message command frame, A-bit 408 indicates that data frame(s) are to follow (a write operation), and in a response frame, A-bit 408 indicates that data frame(s) preceded the response (a read operation). In a data frame, A-bit 408 indicates that more data frame(s) are to follow. The order in which the fields in the Link-Control word are presented is not an essential aspect of the present invention where rather consistency of position is the key aspect.

Information transferred to a particular buffer may be contained in more than one frame or frame group. The first frame for a buffer area always has Start Bit 410 "on" and this bit also indicates the validity of Block Count field 412. This count indicates the total number of 256 byte blocks that will be transferred to the buffer. This count does not indicate the length of the presently transmitted frame. (Note, though, that the 256 byte block size is used herein only as an example of the presently preferred embodiment.) The transmitter can terminate the frame with CRC word 308 on any 256 byte boundary of information field 306. When the transmitter resumes the transfer to the buffer, it starts the new frame with the Start Bit 410 in the Link-Control word reset to zero. The zero value of Start Bit 410 indicates that this frame is a continuation of the previous frame targeted to the same buffer. The receiver knows that all of the information has been received when the total number of 256 byte blocks transmitted in all of the frames have been received and satisfy Block Count 510 transmitted in the Link-Control word of the first frame. A buffer area such as 214 can be transmitted by sending any number of frames, from one frame to the total number of 256 byte blocks needed. For example, a 1024 byte buffer area can be transmitted in any number of frames from one to four.

Figure 5:
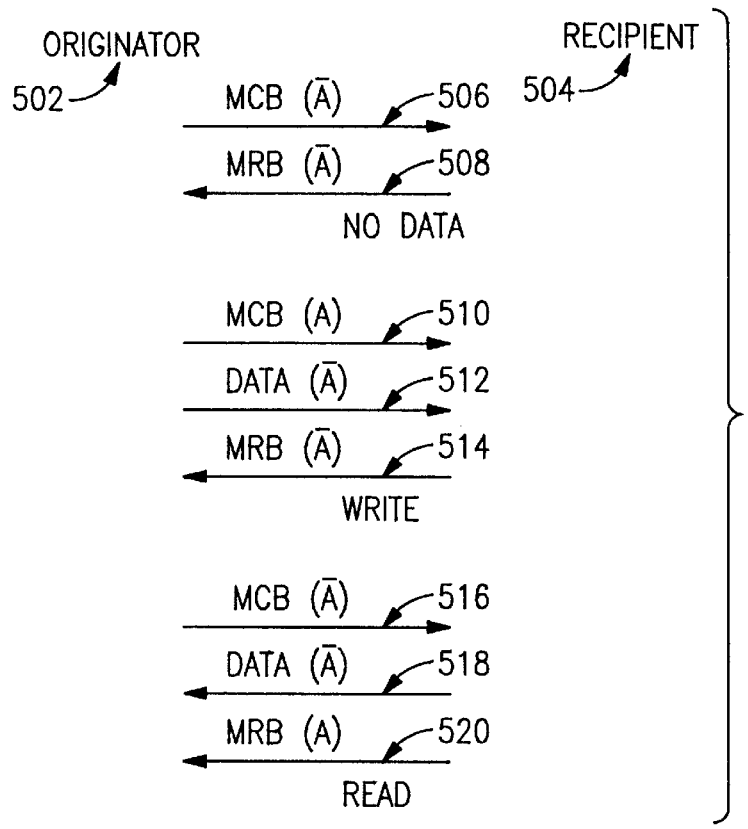
FIG. 5 is a flow exchange diagram illustrating sequences of command, data and response being exchanged between two computing elements or systems.
Figure 6:
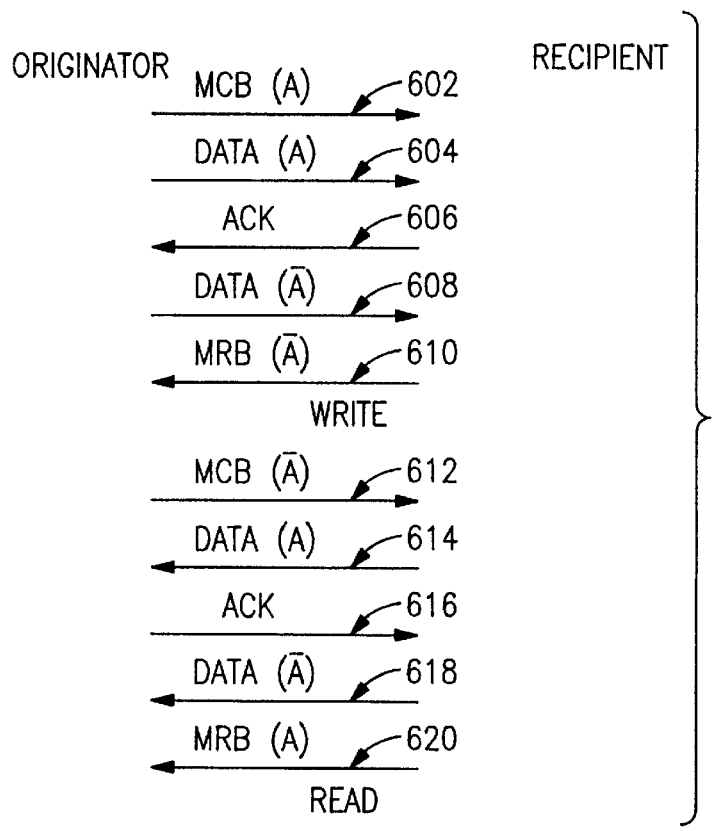
FIG. 6 is a flow exchange diagram illustrating additional sequences of command, data and response exchanges where multiple data transfers are performed.

Although not provided with sequence numbers, each frame is interlocked with those of subsequent and previous frames. The interlocking is accomplished by the protocol on the link. For example, each message for a particular buffer set starts with a message command, followed by data, followed by a message response. Each of these types of transmissions has a unique Link-Control word since each transmission is targeted to differing buffer set areas. FIGS. 5 and 6 illustrate the protocols.

FIG. 5 shows three operational examples. The first example shows a message command and response with no data transfer. In this example, originator 502 sends a message command in a Message Command Block (MCB) 506. The Link-Control word 302 for this frame has A-bit 408 set to zero since there was no data to follow. After the message command has been processed, recipient 504 sends a message response in a Message Response Block (MRB) 508. The Link-Control word for this frame also has A-bit 408 set to zero since there was no data preceding the response. In this example, and in all of the following examples, a timer is initialized to a predetermined value when the MCB is sent. While the message command is outstanding, the timer counts down toward zero. If the timer does not reach zero before the MRB is received, the operation completes normally. If the timer reaches zero (expires) before the MRB is receive, a higher level recovery procedure is invoked.

The second example in FIG. 5 illustrates a write operation for a single data area. In this case MCB 510 has A-bit 408 set to "one" since there is at least one data area to follow. After the MCB, the originator sends data area (DATA) 512. A-bit 408 in this data frame is set to zero because there are no more data areas to follow. After the recipient processes the message command and its associated data, it sends a response, MRB 514. A-bit 408 in MRB 514 is set to zero since there was no data preceding the response. The third example in FIG. 5 illustrates a read operation for a single data area. In this case MCB 516 has A-bit 408 set to zero since there are no data areas to follow. The recipient processes the message command and returns the data area (DATA) 518. A-bit 408 in this data frame is set to zero because there are no more data areas to follow. After the recipient sends the DATA frame, it sends response frame (MRB) 520. The A-bit in this MRB is set to "one" since there was at least one data area preceding the response.

FIG. 6 shows two examples of transferring multiple data areas. In the first example, a write operation transferring two areas is performed by the originator. As in the single data area example, MCB 602 and first data area 604 are sent by the originator. First data area 604 has A-bit 408 set to "one" indicating that more data areas are to follow. The recipient processes the first data area by moving it to main storage freeing the buffer area for the receipt of the next data area. Next, the recipient sends an acknowledge frame (ACK) 606. This frame contains no information field 306, but the Link-Control word identifies the destination buffer set. The originator responds to the ACK by sending the next (and last) data area (DATA) 608. The A-bit in this data frame is set to "zero" because there are no more data areas to follow. After the recipient processes the message command and its associated data, it sends a response, MRB 610. MRB 610 has A-bit 408 "off" as in the single data area write example (514 in FIG. 5).

The second example in FIG. 6 is a read operation transferring two data areas. The originator starts by sending MCB 612. The recipient responds by returning a data area (DATA) 614. The A-bit in this data frame is "on" indicating that more data areas are to follow. After the originator receives the data area and moves it to main storage, the buffer area is free for the receipt of the next data area. The originator then sends acknowledge frame (ACK) 616. This ACK frame is similar to the ACK frame 606 used in the "write" case. The recipient responds to ACK frame 616 by sending next data area (DATA) 618 to the originator. A-bit 408 in this data frame is "off" indicating that this is the last data area. After the recipient sends the DATA frame, it sends response (MRB) 520. A-bit 408 in MRB 620 is set to "one" since there was at least one data area preceding the response (see 520 in FIG. 5).

It must be understood that while only one operation for a single buffer set is shown in the examples of FIGS. 5 and 6, multiple buffer sets are typically using the link at the same time and that the traffic on the link consists of interleaved frames sent for multiple buffer sets.

Returning to FIG. 3, it is important to note that Link-Control word 302 and information field 306 have independent error checking. This checking is provided by the encoding of the data for serial transmission (the 8 bit/10 bit code) as described in U.S. Pat. No. 4,486,739, issued Dec. 4, 1984, to Franaszek et al. for "Byte Oriented DC Balanced (0,4) 8B/10B Partitioned Block Transmission Code" assigned to the same assignee of the present invention, and CRC fields 304 and 308. If the Link-Control word is in error, the entire frame is considered lost since the receiver does not know anything with sufficient certainty about the frame, such as frame type or buffer set number. If the Link-Control word is not in error and only the information field is in error, the Link-Control word provides the receiver of the damaged frame with enough information to initiate recovery procedures. Transmission errors usually affect only a few bits at a time and since the information field is much longer that the Link-Control word, there is a higher chance that a transmission error will affect the information field and not the Link-Control word. This means that most transmission errors affecting a frame can initiate recovery procedures without waiting for a link timeout.

The final outcome of a successful error recovery is the restoring of the system to the state in which it would have been if the error had never occurred. The recovery process is divided into two steps. The first step is to clear the message from the system. This clearing step is performed by the originator, recipient, and message processor. Recall that the message processor executes the message command specified in the MCB and is located in the recipient buffer set. Once the message is cleared, an Interface Control Check (IFCC) condition along with a reason code is signaled to the system that sent the message. In the second step, the system that sent the message then uses the reason code and sometimes information fetched from the message processor to determine final recovery actions. For example, if the system determines that the operation specified by the message was completed, it may not have to take any further action. If the message was never received by the message processor, the system that sent the message re-issues the message.

Figure 7:
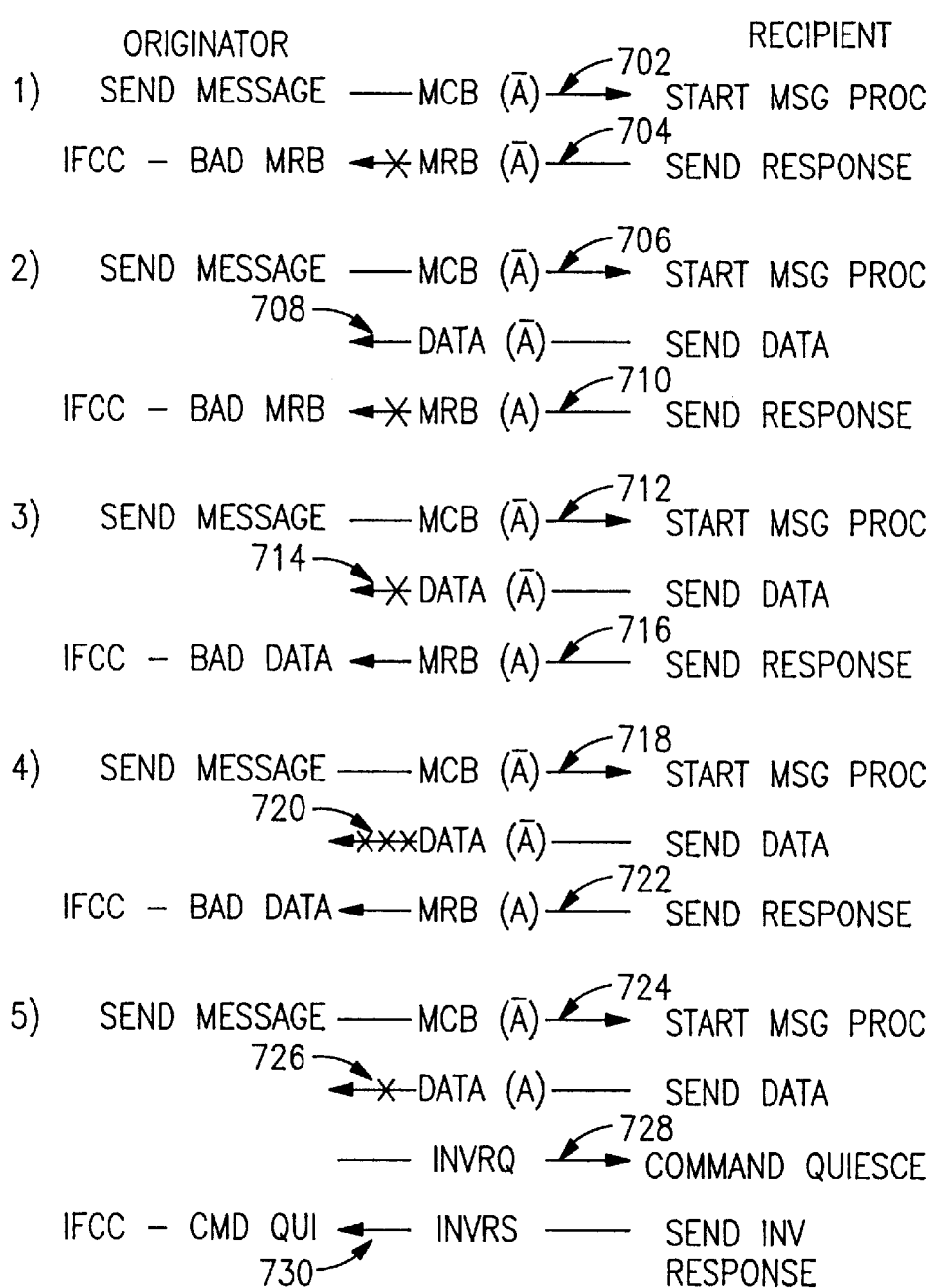
FIG. 7 is an illustration of inbound error sequences and their recovery actions.
Figure 8:
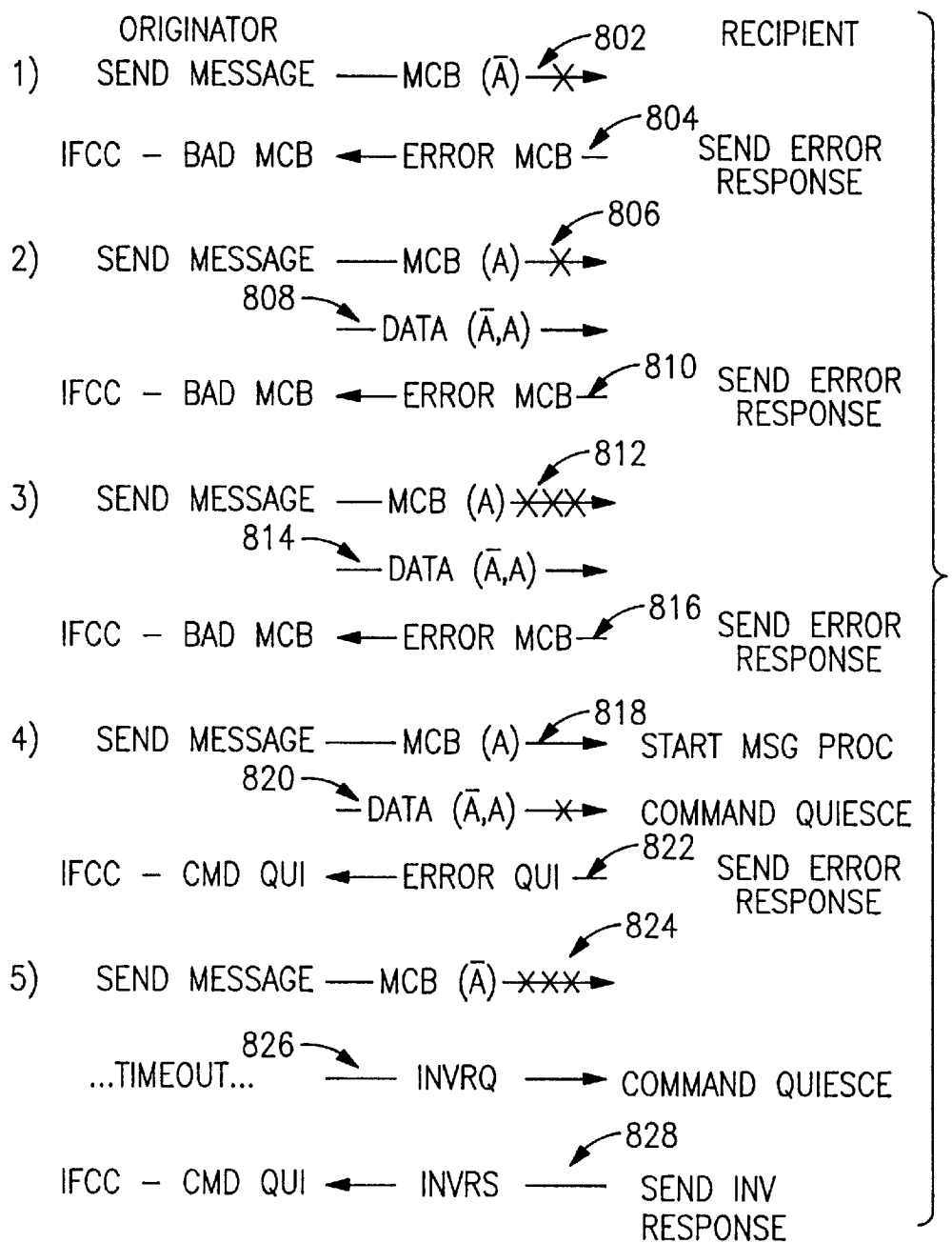
FIG. 8 is an illustration of outbound error sequences and their recovery actions.

This invention relates to the first step of the recovery process described in the preceding paragraph. FIGS. 7 and 8 show ten sequences involving link errors, and these sequences demonstrate all of the possibilities. In both FIGS. 7 and 8 the left hand columns marked ORIGINATOR show the actions taken by the originator. Each of the ten sequences starts with a SEND MESSAGE instruction executed by the originating system and ends with an Interface Control Check (IFCC). The right hand columns marked RECIPIENT (in FIGS. 7 and 8) show the actions taken by the recipient. These actions differ from one sequence to another and depend on the link error. The middle columns show the frames exchanged. Each arrow represents a frame, and the 'x' and 'xxx' represent link errors. The 'x' indicates that only the information field of the frame has been damaged and the Link-Control word is still error free. The 'xxx' indicates that the Link-Control word has been damaged and that the entire frame is considered lost and is to be discarded.

While MCB, MRB, and DATA frames have been previously described, FIG. 7 shows the Invalidate Request (INVRQ) and Invalidate Response (INVRS) frames. These two frames are used in other systems as the recovery mechanism for link timeout situations, and their application in this invention has been expanded beyond the timeout case. FIG. 8 introduces the ERROR frame which is unique to the present invention.

The first four sequences of FIG. 7 involve errors that are handled completely by the originator without any action by the recipient or the message processor. The originator detects the error and, by the context, knows that the operation has been executed by the recipient (to some extent) and that the buffer set is left in the idle state. The first sequence shows the exchange of MCB 702 and MRB 704 where there is a link error in the information field of the MRB 704. The originator posts an IFCC to the computer system with a reason code of "damaged MRB" (IFCC-BAD MRB). The second sequence shows a read operation of a single data frame 708. In this case data frame 708 is error free but the MRB 710 information field has a link error. The originator posts an IFCC to the computer system with a reason code of "damaged MRB" (IFCC-BAD MRB). The third and fourth sequences also show a read operation of a single DATA frame 714 and 720, respectively. In one case data frame 714 has a link error in the information field and in the other case data frame 720 has a link error in the Link-Control word. In both cases MRB frames 716 and 722, respectively, are error free. In the first of these two sequences, the originator detects damaged data frame 714 and waits to receive the MRB before posting an IFCC to the program with a reason code of "damaged DATA" (IFCC-BAD DATA). In the second of these two sequences, DATA frame 720 is lost, and the originator detects this when MRB frame 722, with A-bit 408 "on," is received. After MRB 722 is received, the originator posts an IFCC to the program with a reason code of "damaged DATA" (IFCC-BAD DATA).

The fifth and last sequence of FIG. 7 shows a link error in the information field of data frame 726. Data frame 726 has A-bit 408 "on" indicating that more data frames are to follow, and the recipient is waiting to receive an "acknowledge frame" from the originator before proceeding. Instead of sending the acknowledge, the originator returns an Invalidate Buffer Request (INVRQ) frame 728. When the recipient decodes this frame, it signals the message processor to quiesce the command specified in the message. The message processor stops sending more DATA areas and resets any facilities it was using to execute the command before signaling back to the recipient. The recipient then resets the buffer set to prepare for the next message and sends an Invalidate Buffer Response (INVRS) 730 back to the originator. The originator posts an IFCC to the computer system (102 for example) with a reason code of "command quiesced" (IFCC-CMD QUI).

Turning now to the outbound errors in FIG. 8, the first three are handled by the originator and recipient without any action by the message processor. The first sequence shows a link error in the information field of MCB 802. In this case A-bit 408 is "off" indicating that no data frames are to follow. The recipient does not signal the message processor and it resets the facilities associated with the buffer set to prepare for the receipt of the next message. The recipient then sends ERROR frame 804 back to the originator. ERROR frame 804 includes a reason code of "damaged MCB" (MCB) indicating that the command was never executed by the message processor. The originator posts an IFCC to the computer system with a reason code of "damaged MCB" (IFCC-BAD MCB). The second and third sequences are quite similar to the first sequence. In the second sequence, MCB frame 806 has A-bit 408 "on" indicating that there are data frames to follow. The recipient has to wait for data frame 808 before returning ERROR frame 810. Data frame 808 may have A-bit 408 either "on" or "off," and in either case it is discarded. The third sequence shows an error in the Link-Control word of MCB 812. In this case, when data frame 814 arrives, the recipient knows that it should have been preceded by an MCB. Again, data frame 814 may have A-bit 408 either "on" or "off," and in either case it is discarded and ERROR frame 816, with the damaged MCB reason code (MCB), is returned.

The fourth sequence of FIG. 8 shows an error in the information field of data frame 820. In this case, the message processor has already started to execute the command, so the recipient has to signal the message processor to quiesce the command. When the message processor is finished, it signals the recipient and ERROR frame 822 with a reason code of "command quiesced" (QUI) is returned to the originator. The originator posts an IFCC to the computer system with a reason code of "command quiesced" (IFCC-CMD QUI).

The fifth and last sequence of FIG. 8 is the message timeout case. Here there is an error in the Link-Control word of MCB 824, so the frame is lost. When the originator detects a timeout, it sends INVRQ frame 826 and waits for INVRS frame 828. The Invalidate buffer portion of this sequence is the same as the fifth sequence of FIG. 7.

FIG. 9 is a table of the four different error reason codes that are passed back to one of the linked computer systems. The recovery actions, to be performed by the computer system for each of the IFCC reason codes, are also listed. In the 'BAD MCB' case, the program knows that the command was not executed. The recovery action is to simply execute SEND MESSAGE again. The 'BAD MRB' case implies that the command was executed, all of the data (if any, read or write) was transferred successfully, and only the MRB was damaged. Depending on the command, the MRB may or may not contain pertinent information, and the program may send a request to the message processor to resend the MRB. The 'BAD DATA' case indicates that the final data frame of a read operation was damaged. Depending on the command, the program may have to either request the DATA again or use some other recovery process if the DATA at the recipient might have changed. The 'CMD QUI' (command quiesced) case requires the most global recovery process by the program since the state of the message processor is unknown. The program does not even know if the command was ever received by the message processor. Recovery from these errors requires the computer system to retrieve information from the message processor in order to determine its state, and thus the desired recovery action. Whatever actions ensue as a result are, however, not a part of the present invention.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for direct transmission of frames between an originator at a first location and a recipient at a second location, said frames having at least a link-control field, said method for transmitting comprising the steps of:

transmitting from said first location a message command frame having an information field specifying a command;

receiving said transmitted message command frame at said second location;

discarding said received message command frame upon the determination that an error is present in said information field of said message command frame and replying to said first location by transmitting thereto a frame indicating an error status in the received message command frame; and notifying said originator of the resulting message error status.

2. The method of claim 1 wherein said message command frame includes an indication (A-bit) in said link-control field that a data frame is to be sent and wherein there is further included the following steps:

after said transmitting step, transmitting from said first location a data frame having an information field containing data for transmission to said second location;

receiving said data frame at said second location, the transmission of said data frame having been indicated by said previously transmitted A-bit; and discarding said data frame upon detection that an error had been present in the information field of said message command frame.

3. A method for direct transmission of frames between an originator at a first location and a recipient at a second location, said frames having at least a link-control field, said method for transmitting comprising the steps of:

transmitting from said first location a message command frame having an information field specifying a command;

receiving said transmitted message command frame at said second location;

after said step of transmitting said message command frame, transmitting from said first location a data frame having an information field containing data for transmission to said second location, said message command frame having included an indication (A-bit) in said link-control field that said data frame was to be sent;

receiving said data frame at said second location, the transmission of said data frame having been indicated by said A-bit in said message command frame;

discarding said data frame upon detecting that an error is present in said link-control field of said message command frame;

discarding said received message command frame upon the determination that an error is present in said link-control field of said message command frame and replying to said first location by transmitting thereto a frame indicating an error in the received message command frame; and notifying said originator of the resulting message status.

4. A method for direct transmission of frames between an originator at a first location and a recipient at a second location, said frames having at least a link-control field, said method for transmitting comprising the steps of:

transmitting from said first location a message command frame having an information field specifying a command and also having a link=control field having an indication (A-bit) that a data frame is to be sent;

receiving said transmitted message command frame at said second location;

starting a message processor at said second location;

after said step of transmitting said message command frame, transmitting from said first location at least one data frame having an information field containing data for transmission to said second location, said message command frame having included an indication (A-bit) in said link-control field that said data frame was to be sent;

receiving said at least one data frame at said second location, the transmission of said data frame having been indicated by said A-bit in said message command frame;

determining whether an error has occurred in said information field of said at least one data frame;

providing a quiesce indication to said message processor upon the condition that an error has occurred in said information field of said at least one data frame;

discarding said at least one received data frame upon the determination that an error is present in said information field of said at least one data frame and replying to said first location by transmitting thereto a frame indicating that an error has occurred in said at least one received data frame; and notifying said originator of the resulting message status.

5. A method for direct transmission of frames between an originator at a first location and a recipient at a second location, said frames having at least a link-control field, said method for transmitting comprising the steps of:

transmitting from said first location a message command frame having an information field specifying a command;

receiving said transmitted message command frame at said second location;

starting a message processor at said second location;

transmitting from said second location to said first location a message response frame;

discarding said message response frame upon detection that an error is present in the information field of said message response frame; and notifying said originator of resulting message response.

6. The method of claim 5 further including the steps of:

transmitting from said recipient to said originator, a data frame after said message processor is started, and receiving at said first location an error-free data frame.

7. A method for direct transmission of frames between an originator at a first location and a recipient at a second location, said frames having at least a link-control field, said method for transmitting comprising the steps of:

transmitting from said first location a message command frame having an information field specifying a command;

receiving said transmitted message command frame at said second location;

starting a message processor at said second location;

transmitting from said recipient to said originator a data frame after said message processor is started;

receiving said data frame at said first location;

discarding said data frame upon detection of an error therein;

transmitting a message response frame from said second location to said first location; and receiving said message response frame at said first location notifying said originator of resulting message status.

8. The method of claim 7 in which said discarding step occurs as a result of an error is the information field of said data frame.

9. The method of claim 7 in which said discarding step occurs as a result of an error in the link-control field of said data frame and in which said message response frame includes an indication in the link-control field of said message response frame that a data frame had been previously sent from said second location.

10. A method for direct transmission of frames between an originator at a first location and a recipient at a second location, said frames having at least a link-control field, said method for transmitting comprising the steps of:

transmitting from said first location a message command frame having an information field specifying a command;

receiving said transmitted message command frame at said second location;

starting a message processor at said second location;

transmitting a data frame from said second location to said first location, said data frame containing a link-control field which includes an indication (A-bit) that more data is to be sent;

receiving said transmitted data frame said second location at said first location;

discarding said data frame upon determination that an error is present in an information field of said data frame;

transmitting to said second location a frame directing said message processor to quiesce;

transmitting from said second location a frame indicating that said message processor was quiesced; and notifying said originator of the resulting message response.

* * * * *